US011106906B2

(12) United States Patent
Bassu et al.

(10) Patent No.: US 11,106,906 B2
(45) Date of Patent: Aug. 31, 2021

(54) SYSTEMS AND METHODS FOR INFORMATION EXTRACTION FROM TEXT DOCUMENTS WITH SPATIAL CONTEXT

(71) Applicant: American International Group, Inc., New York, NY (US)

(72) Inventors: Devasis Bassu, Bedminster, NJ (US); Stephan Braig, Livingston, NJ (US); Yoann Poirier, New York, NY (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 153 days.

(21) Appl. No.: 16/506,889

(22) Filed: Jul. 9, 2019

(65) Prior Publication Data

US 2021/0012103 A1    Jan. 14, 2021

(51) Int. Cl.
| | |
|---|---|
| *G06K 9/00* | (2006.01) |
| *G06K 9/20* | (2006.01) |
| *G06F 16/28* | (2019.01) |
| *G06F 16/30* | (2019.01) |
| *G06F 40/10* | (2020.01) |

(52) U.S. Cl.
CPC ....... *G06K 9/00463* (2013.01); *G06F 16/288* (2019.01); *G06F 16/30* (2019.01); *G06F 40/10* (2020.01); *G06K 9/2054* (2013.01)

(58) Field of Classification Search
CPC .................................................. G06K 9/00463
See application file for complete search history.

(56) References Cited

U.S. PATENT DOCUMENTS

| | | | | |
|---|---|---|---|---|
| 10,853,567 | B2* | 12/2020 | Hegde et al. ......... | G06F 40/186 |
| 2011/0182422 | A1* | 7/2011 | Anderson et al. ....... | G06K 9/00 |
| 2013/0080184 | A1* | 3/2013 | Streat et al. ........... | G06Q 50/22 |
| 2014/0195891 | A1* | 7/2014 | Venkata Radha Krishna Rao et al. ..................... | G06F 17/218 |
| 2018/0341688 | A1* | 11/2018 | Ganesh et al. .......... | G06F 17/30 |

OTHER PUBLICATIONS

Wikipedia.org. "Information Extraction" (May 27, 2019) (available at: https://en.wikipedia.org/wiki/Information_extraction).

(Continued)

*Primary Examiner* — James J Debrow
(74) *Attorney, Agent, or Firm* — Snell & Wilmer L.L.P.

(57) ABSTRACT

Performing information extraction from an electronic document is disclosed. A method comprises: receiving a semi-structured input document; retrieving an entity model that provides one or more domain variable definitions for one or more domain variables, wherein the entity model and the input document correspond to a common domain; determining that the input document includes an entity that satisfies a first domain variable definition corresponding to a first domain variable; retrieving a relational model that provides, for the first domain variable, one or more relational definitions comprising spatial restrictions for one or more values corresponding to the first domain variable; extracting one or more data elements from the input document that satisfy the one or more relational definitions; and generating an information graph having a structured data format, wherein the one or more data elements extracted from the input document correspond to the first domain variable in the structured data format.

20 Claims, 13 Drawing Sheets

(56) References Cited

OTHER PUBLICATIONS

Manning et al. "An Introduction to Information Retrieval," Cambridge University Press (Apr. 1, 2009).
Wikipedia.org. "Natural Language Processing" (Jun. 28, 2019) (available at: https://en.wikipedia.org/wiki/Natural_language_processing).
Manning et al. "Foundations of Statistical Natural Language Processing," The MIT Press (1999).
Deng et al. "A Joint Introduction to Natural Language Processing and to Deep," Deep Learning in Natural Language Processing, Chapter 1, Springer Publishing, Singapore, pp. 1-23 (2018).
Fang et al. "A Table Detection Method for Multipage PDF Documents via Visual Seperators and Tabular Structures," 2011 International Conference on Document Analysis and Recognition, pp. 779-783 (Sep. 2011).
Tengli et al. "Learning Table Extraction From Examples," Proceedings of the 20th International Conference on Computational Linguistics (COLING '04), Geneva, Switzerland (2004).
Perez-Arriaga et al. "TAO: System for Table Detection and Extraction from PDF Documents," Proceedings of the 29th International Florida Artificial Intelligence Research Society (FLAIRS) Conference (2016).
ACORD.org. "ACORD Forms" (accessed on Jul. 8, 2019) (available at: https://www.acord.org/forms-pages/acord-forms).
FindLaw.com. "What Is a Loss Run Report?" (Mar. 30, 2018) (available at: (https://web.archive.org/web/20180330073038/http://www.findlaw.com/).
Webb et al. "Spring Boot Reference Guide," 2.1.6 Release (2018) (available at: https://docs.spring.io/spring-boot/docs/2.1.6.RELEASE/reference/pdf/spring-boot-reference.pdf).
Object Management Group. "Unified Modeling Language," Version 2.5.1 (Dec. 2017) (available at: https://www.omg.org/spec/UML/2.5.1/PDF).
Wikipedia.org. "Class Diagram" (Jun. 12, 2019) (available at: https://en.wikipedia.org/wiki/Class_diagram.
Abbyy. "Abbyy FineReader Server—Features" (accessed on Jul. 8, 2019) (available at: https://www.abbyy.com/en-us/finereader-server/features/).
Weil et al. "Tesseract—Wiki," GitHub tesseract-ocr (May 25, 2019) (available at: https://github.com/tesseract-ocr/tesseract/wiki).
Google Cloud. "Detect text in images," Cloud Vision API Documentation (Jun. 13, 2019) (available at: https://cloud.google.com/vision/docs/ocr).
Apache.org. "Apache PDFBox®—A Java PDF Library," PDFBox 2.0.16 (Jun. 27, 2019) (available at: https://pdfbox.apache.org/index.html).
Apache.org. "Apache POI—the Java API for Microsoft Documents" (Apr. 9, 2019) (available at: https://poi.apache.org/).
Wikipedia.org. "Hash Table" (Dec. 9, 2018) (available at: https://web.archive.org/web/20181231035709/https://en.wikipedia.org/wiki/Hash_table).
Wikipedia.org. "k-d tree" (Jun. 23, 2019) (available at: https://web.archive.org/web/20190630065121/https://en.wikipedia.org/wiki/K-d_tree).
Wikipedia.org. "Asymmetric Relation" (Oct. 27, 2016) (available at: https://web.archive.org/web/20170202085240/https://en.wikipedia.org/wiki/Asymmetric_relation/).
Wikipedia.org. "Conjunctive Normal Form" (Jan. 19, 2018) (available at: https://web.archive.org/web/20180128130641/https://en.wikipedia.org/wiki/Conjunctive_normal_form).

\* cited by examiner

SYSTEMS AND METHODS FOR INFORMATION EXTRACTION FROM TEXT DOCUMENTS WITH SPATIAL CONTEXT

TECHNICAL FIELD

The present application relates to the field of information extraction and, more specifically, to a systems and methods for information extraction from text documents with spatial context.

BACKGROUND

The field of information extraction involves automatically extracting structured information from unstructured and/or semi-structured text documents. Examples of text documents to which information extraction can be applied include web documents, news articles, e-books, scanned receipts, resumes, and tax forms, among others.

Text documents may be broadly classified into three categories: fully structured, unstructured, or semi-structured, based on the relative use of textual and spatial contexts. Fully structured documents are documents that are ready for information processing, such as spreadsheets or database documents. Prose-like documents, such as novels or news articles, are examples of unstructured text documents. In unstructured documents, identified entities (e.g., words) in the text documents are related to one another based on a pre-defined language and associated grammar. For example, in the case of English language documents, text entities are words that are read left to right on a line, from the top line to the bottom line on a page, starting at the first page.

By contrast, semi-structured documents are documents in which the location of the data and of the fields holding the data vary from document to document. For example, the shipping address on a purchase order can be in the top left or top middle or bottom right of a document, but the entry is shipping address in any case. Since the data can appear in different locations on a page and/or be structured using different formats (e.g., different formats of tables, for instance) in semi-structured documents, performing information extraction on semi-structured documents can be challenging. Another problem with semi-structured documents is that in some cases, only a few key pieces of information (or certain fields) are truly important. So the challenge is not only to find the important information, but also to understand which information is not important and should therefore be ignored.

While significant advances have been made in information extraction for unstructured text documents, typically using statistical machine learning techniques, very little has been achieved for building information extraction frameworks for semi-structured documents.

SUMMARY

Embodiments of the disclosure provide a method, device, and computer-readable storage medium for information extraction from an electronic document. The method includes: receiving an input document, wherein the input document is a semi-structured document; retrieving an entity model from an entity model storage, wherein the entity model provides one or more domain variable definitions for one or more domain variables, wherein the entity model and the input document correspond to a common domain; determining that the input document includes an entity that satisfies a first domain variable definition corresponding to a first domain variable; retrieving a relational model from a relational model storage, wherein the relational model provides, for the first domain variable, one or more relational definitions for one or more values corresponding to the first domain variable, wherein the one or more relational definitions for the one or more values corresponding to the first domain variable comprise one or more spatial restrictions; extracting one or more data elements from the input document that satisfy the one or more relational definitions; and generating an information graph having a structured data format, wherein the one or more data elements extracted from the input document correspond to the first domain variable in the structured data format.

BRIEF DESCRIPTION OF THE DRAWINGS

FIG. 11A is a screenshot of a spatial model editor, according to one embodiment.

FIG. 11B is a screenshot of a dialog for mapping extracted content using a spatial model editor, according to one embodiment.

DETAILED DESCRIPTION

Embodiments of the disclosure provide a methodology for information extraction from semi-structured text documents, where context is encoded using the text itself and spatial layout of the information in the text documents. The disclosed methodology defines an extensible and reusable framework for the extraction of spatially linked information from semi-structured text documents. For example, the semi-structured text documents may be PDF (portable document format) documents. In some implementations, each page of the PDF document may be an image.

Embodiments of the disclosure allow for real-time learning and training of new, unseen document formats, which is distinguishable from the lengthy batch process associated with conventional machine learning and deep learning algorithms used for information extraction from semi-structured documents. Embodiments of the disclosure use a significantly smaller number of tagged document samples than machine learning and deep learning algorithms to generate a usable model for information extraction. In some embodiments, the output of the disclosed system and method is an information graph having a structured data format (as opposed to a collection of unrelated pieces of content of the input document). In some embodiments, the structured data format may be represented as one or more flattened tables whose columns correspond to fields or variables defined in a target domain, or by nodes connected by edges. In some embodiments, the structured data format may include tables that are linked to one another.

Embodiments of the disclosure may be adopted and applied for information extraction from a diverse set of documents, for example, loss run documents from multiple carriers in the insurance industry. Other domains and document types are also within the scope of the disclosure.

As used herein, semi-structured documents are documents in which the location of the data and of the fields holding the data vary from document to document. Semi-structured documents heavily utilize spatial context (i.e., layout) as a substitute for grammar, typically for representing relationships between various entities. Embodiments of the disclosure provide a novel general-purpose information extraction framework for documents that utilize spatial context for information representation, such as semi-structured documents.

Figure 1:
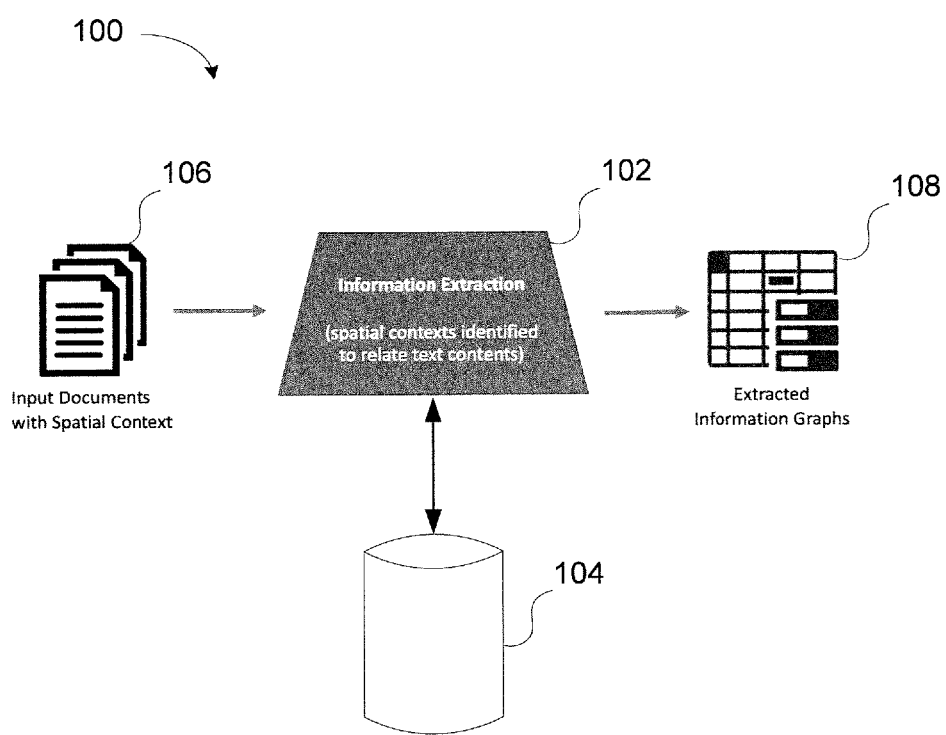
FIG. 1 is a block diagram of a system in accordance with certain embodiments of the disclosure.

Turning now to the figures, FIG. 1 is a block diagram of a system 100 in accordance with certain embodiments of the disclosure. The system 100 includes computing device 102 and a database 104. The system 100 may also include one or more networks, e.g., connecting the computing device 102 with the database 104.

The computing device 102 can be any type of computing device that supports processing operations, including a server device, a personal computer, a laptop computer, a tablet, a telephone, a mobile phone, a smartphone, a smart watch, a personal digital assistant (PDA), a wearable or embedded digital device(s), etc. In some embodiments, the computing device 102 can support multiple types of networks. For example, the computing device 102 may have wired or wireless network connectivity using IP (Internet Protocol) or may have mobile network connectivity allowing over cellular and data networks.

The computing device 102 is configured to receive an input document 106 as input. The input document 106 may be stored on the computing device 102 or may be received over a network. In various embodiments, the input document 106 is a semi-structured text document. The computing device 102 performs information extraction operations on the input document 102 and generates one or more output documents 108. In some embodiments, the computing device 102 uses information (e.g., model information) stored in database 104 (or another computing device) to generate the one or more output documents 108. In other embodiments, the computing device 102 uses information stored in the computing device 102 itself to generates the one or more output documents 108 without interacting with a separate database or separate computing device. In one implementation, the output document 108 comprises a structured information graph in the form of a table. The output document 108 may be a fully structured document that can be used to perform further information processing, where the variables of the output document 108 are domain-specific variables and the values of the variables are extracted from the input document 106. In some examples, the output document 108 may have JSON (JavaScript Object Notation) format.

Figure 2:
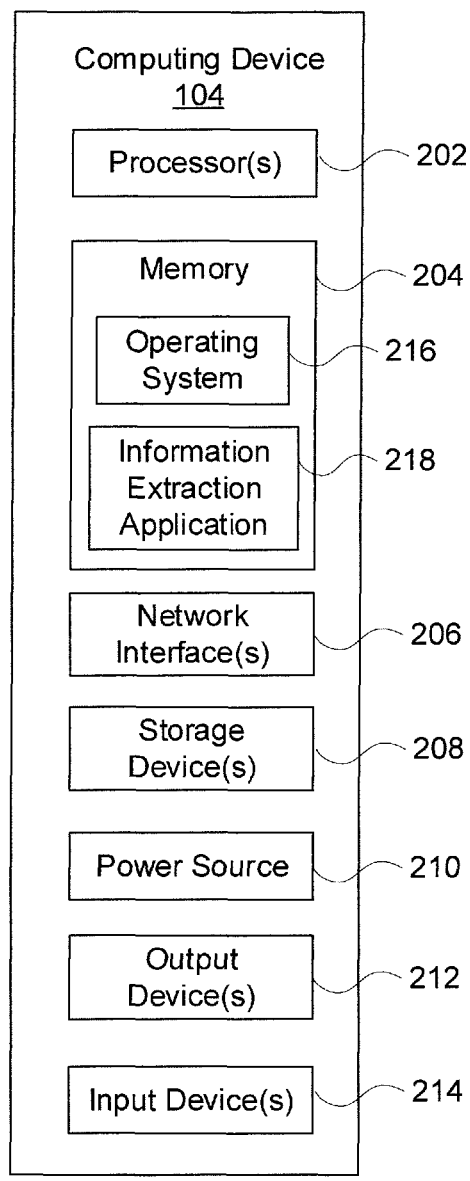
FIG. 2 is a block diagram of basic functional components for a computing device according to some aspects of the disclosure.

FIG. 2 is a block diagram of basic functional components for a computing device 102 according to some aspects of the disclosure. In the illustrated embodiment of FIG. 2, the computing device 102 includes one or more processors 202, memory 204, network interfaces 206, storage devices 208, power source 210, one or more output devices 212, one or more input devices 214, and software modules—operating system 216 and an information extraction application 218—stored in memory 204. The software modules are provided as being contained in memory 204, but in certain embodiments, the software modules are contained in storage devices 208 or a combination of memory 204 and storage devices 208. Each of the components including the processor 202, memory 204, network interfaces 206, storage devices 208, power source 210, output devices 212, input devices 214, operating system 216, and information extraction application 218 are interconnected physically, communicatively, and/or operatively for inter-component communications.

As illustrated, processor 202 is configured to implement functionality and/or process instructions for execution within computing device 102. For example, processor 202 executes instructions stored in memory 204 or instructions stored on a storage device 208. Memory 204, which may be a non-transient, computer-readable storage medium, is configured to store information within computing device 102 during operation. In some embodiments, memory 204 includes a temporary memory, an area for information not to be maintained when the computing device 102 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some embodiments, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

Computing device 102 uses network interface 206 to communicate with external devices, databases, or servers via one or more networks 108 (see FIG. 1), and other types of networks through which a communication with the computing device 102 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, ZigBee, Z-Wave, and Universal Serial Bus (USB), among others.

Computing device 102 includes one or more power sources 210 to provide power to the device. Non-limiting examples of power source 210 include single-use power sources, rechargeable power sources, and/or power sources developed from nickel-cadmium, lithium-ion, or other suitable material.

One or more output devices 212 are also included in computing device 102. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The computing device 102 includes one or more input devices 214. Input devices 214 are configured to receive input from a user or a surrounding environment of the user through tactile, audio, and/or video feedback. Non-limiting examples of input device 214 include a photo and video camera, presence-sensitive screen, a mouse, a keyboard, a voice responsive system, microphone or any other type of input device. In some examples, a presence-sensitive screen includes a touch-sensitive screen.

The computing device 102 includes an operating system 216. The operating system 216 controls operations of the components of the computing device 102. For example, the operating system 216 facilitates the interaction of the processor(s) 202, memory 204, network interface 206, storage device(s) 208, input device 214, output device 212, and power source 210.

As described in greater detail herein, the computing device 102 uses information extraction application 218 to extract data from semi-structured documents. According to various embodiments, information within a semi-structured document represented by (1) a descriptions of one or more entities, and (2) the relationships between those entities (e.g., how the entities interact with each other).

The insurance industry, for example, is document intensive. A significant volume of the text documents are semi-structured in the insurance industry and are often provided as scanned PDF documents. While there is some amount of document standardization in the insurance industry (e.g., ACORD forms), only a small fraction of documents adhere to such standards, and even the standardized forms are revised frequently due to the continually evolving nature of the insurance business. From a statistical viewpoint, there is a large amount of variability in document formats in the insurance industry, and not necessarily many samples available for each variation.

As such, an automated information extraction solution, as disclosed herein, is useful for extracting information from semi-structured text documents, such as insurance industry documents. As discussed in greater detail below, the disclosed techniques support fast learning and operate with a small number of training samples. Advantageously, the disclosed techniques can significantly reduce or eliminate expensive, onerous, and error-prone manual data entry processes.

Again using the insurance industry as an example, "loss run documents" within the insurance industry refer to a set of documents that contain historical claims data for a given insured (e.g., company or individual). The disclosed system and method may be used to extract information from loss run documents, as described herein.

In various embodiments, the disclosed system and method can be applied to a variety of document domains. One example domain is the insurance industry and, in particular, performing information extraction on loss run documents. Loss run documents are a common document in a policy underwriting process, as they show the loss history of a client that desires a quote. The loss history is a critical input into the underwriting decision-making process and, in many cases, not only affects the premium that gets charged but also fundamentally determines whether or not a policy gets offered to a potential client. The challenge is that loss run documents can easily reach tens of pages or sometimes even one hundred or more pages in length depending on the line of business covered.

Automatic processing of loss run documents is challenging since loss run documents are at best unique to each insurance carrier and, in many cases, different formats exist even for one insurance carrier. The format and structure of loss run documents is complex and can be very different from one loss run document to the next, and especially for one insurance carrier format relative to another insurance carrier format, but sometimes even within one insurance carrier.

The effort currently needed to transcribe the information in loss run documents into a format that is usable for underwriting is enormous, and currently requires extensive manual labor. The disclosed implementation of the information extraction system and method solves these challenges and provides for a far more efficient process to extract information from semi-structured documents, such as loss run documents.

Figure 3:
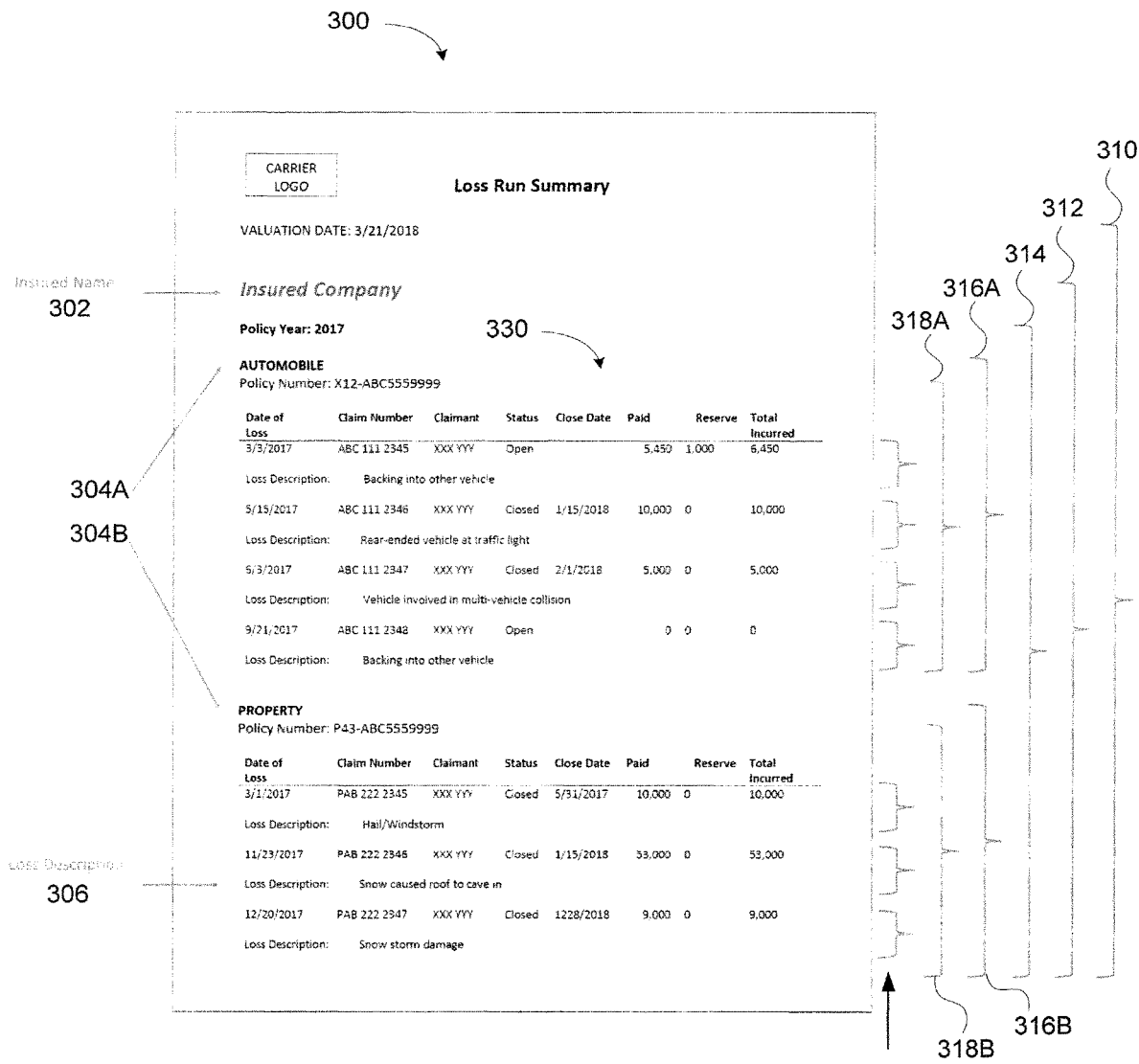
FIG. 3 illustrates an example of a loss run document, according to one embodiment.

FIG. 3 illustrates an example of a loss run document 300, according to one embodiment. As shown, the loss run document 300 employs complex spatial layouts to present information. Information in the loss run document 300 may be labeled or unlabeled. For example, the insured name 302 and lines of business 304A, 304B are unlabeled. The loss description 306 is labeled, i.e., with the label "Loss Description:".

Also, the information in the loss run document 300 may have different "scopes" within the document. As shown in the example in FIG. 3, a scope 310 of the valuation date (e.g., "3/21/2018") is the entire loss run document 300. A scope 312 of the named insured is also shown (i.e., one or more named insureds may appear on one loss run document spanning one or more pages). A scope 314 of the policy year is shown (i.e., one or more policy years may appear on one loss run document spanning one or more pages). Scopes 316A and 316B correspond to the lines of business 304A and 304B, respectively. Scopes 318A, 318B of different policy numbers are also shown. Also, scope 320 of each individual claim record is also shown in the example in FIG. 3.

In a semi-structured document (such as the example loss run document 300 in FIG. 3), a table 330 may store some additional information. A table record of the table 330 may have additional labeled or unlabeled pieces of information that may or may not be related to column labels of the table 330. In some implementations, a table may have multiple rows of column labels, which means that an individual table record would have multiple rows of information where each row of information corresponds to a row of column labels. In other implementations, such as with loss run documents, it is common for the document to include inconsistent use of font size and modifiers with some of the unlabeled text. As such, determining information scope presents a challenge for information extraction systems, where the direction of the scope is not necessarily in the forward direction from where the information appears within the document. For example, the valuation date (shown at the top of the loss run document 300 in FIG. 3) may instead appear at the bottom of each page or only once at the beginning or end of the loss run document.

Embodiments of the disclosure provide an information extraction solution for semi-structured text documents using a supervised learning framework. The supervised learning framework provides an extensible, layered information model library that is built upon a core relative spatial information model, and references an external domain-specific vocabulary. An offline visual model editor may be used to create and edit models using untagged sample documents, which enables incremental model building with real-time visual feedback. An offline automated model generator may be used that generates a model given a set of tagged sample documents. In some implementations, a computer system or an online document processing system may apply pre-built models to an incoming document to generate an information graph.

In some embodiments, the information extraction framework is based on the following core principles for semi-structured text documents. Some implementations characterize certain information as "anchor text" content that acts as a label or tag for a page, a document, or for other value texts. For example, in FIG. 3, the text "VALUATION DATE:" acts as an anchor text for the associated value "03/21/2018". The disclosed embodiments do not require that all values be associated with anchor texts.

Some embodiments provide a persistence of localized relative spatial placement. This enables the notion of a spatial entity as a collection of texts (i.e., anchors and corresponding values) with consistent relative spatial placement within a local context. Some examples include: (1) a table definition that may appear multiple times on the same page or on different pages, or (2) a key-value pair definition that may appear anywhere in the document, perhaps even within a table. In some embodiments, an entity may be a composite entity formed by one or more other entities. In some cases, the composite entity may be formed comprising one or more entities of a particular entity type.

As also shown in the example in FIG. 3, information within a document may have different scopes. For example, for a resume document, the name at the beginning of the resume document applies to the entire document, whereas a start/end date range for a particular work experience on a resume document corresponds to just the content related to that work, but not other content.

Figure 4:
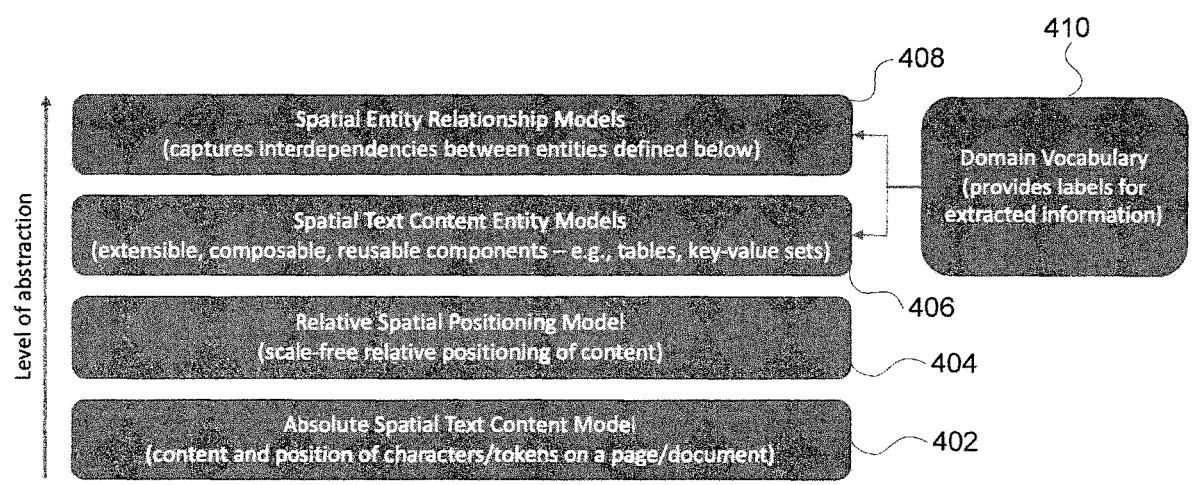
FIG. 4 is a block diagram of a framework for information extraction that uses layered information models with increasing levels of abstraction, according to one embodiment.

FIG. 4 is a block diagram of a framework for information extraction that uses layered information models with increasing levels of abstraction, according to one embodiment. In one implementation, the framework comprises four layers of abstraction, including absolute spatial text content model 402, relative spatial positioning model 404, spatial text content entity models 406, and spatial entity relationship models 408.

The first two layers (i.e., absolute spatial text content model 402 and relative spatial positioning model 404) provide models for capturing spatial context, which are independent of the domain or application. The top two layers (i.e., spatial text content entity models 406 and spatial entity relationship models 408) enable defining spatial entities and relationships between spatial entities using the first two layers. Additionally, the top two layers utilize domain-specific vocabulary (or "application-specific" vocabulary) 410, which is used to label the extracted content in the generated output (e.g., information graph). In some implementations, learning involves creating a model that captures the various spatial entities and associated relationships for a given set of sample documents.

In various embodiments, the disclosed system and method extracts information from input documents to generate an output (e.g., information graph). However, raw content extracted from a document may be not useful to downstream systems or users by itself, as those pieces of information have not yet been assigned any meaning. For example, in the loss run document 300 in FIG. 3, the system may have extracted "3/21/2018" as a value text associated with key text "VALUATION DATE". However, such an extraction by itself does not yet clarify the meaning of the text "3/21/2018". Embodiments of the disclosure provide domain-specific vocabulary 410 with domain-specific definitions to which pieces of extracted content are mapped. In one example, any extracted content that is associated with the label "VALUATION DATE:" is mapped to the loss run domain model variable "ValuationDate", which is defined as the date as of which the claims information contained in a loss run document is valued.

In one implementation, a generic domain-specific field URI (uniform resource identifier) scheme is used to incorporate information mapping to a target domain model within the information extraction system and method, which keeps the system and method decoupled from any target application domain. For example, the loss run application may have a rich JSON (JavaScript Object Notation) schema that defines the loss run data model. One embodiment can provide the canonical JSON path URI to reference the fields of interest within the loss run schema. The disclosed system and method thus uses a set of field URIs that define the domain vocabulary.

Absolute Spatial Text Content Model 402

Referring to FIG. 4, the absolute spatial text content model 402 layer is used for capturing the low-level details within a text document, such as the content and position of characters or tokens on a page or document. In various implementations, a token may be a word, a date, a financial amount, or some other piece of information located on the page. The absolute spatial text content model 402 provides a normalized view of the "raw" document and shields the rest of the system from document-specific processing. In one implementation, adapters for reading PDF documents with or without any text overlay may be used. For example, pure image-based PDFs may be first processed using OCR (optical character recognition).

The disclosed system and method may use appropriate pre-processing to create an instance of the content model for any given document, as described in this section. While the model may be extended as needed for specific applications, the core model captures both the textual and spatial contents within any given document.

Figure 5:
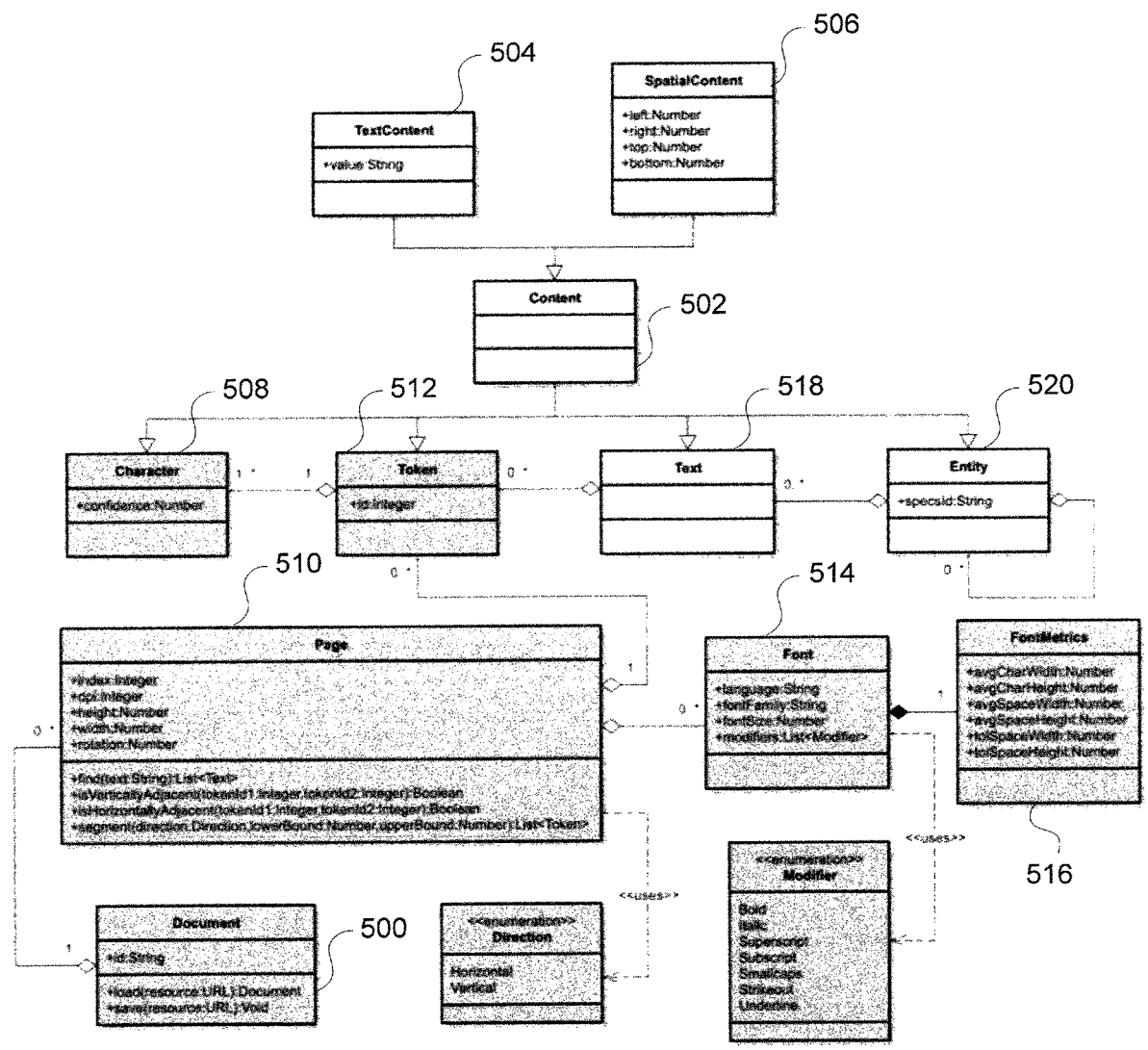
FIG. 5 is an example of a representation of an absolute spatial text content model, according to one embodiment.

FIG. 5 is an example of a UML (Unified Modeling Language) representation of an absolute spatial text content model, according to one embodiment. FIG. 5 includes a Content class having both textual content 504 and spatial content 506. Spatial content 506 for a given text is defined as the minimal bounding rectangle containing the text. The Character class 508 provides an atomic representation of text within any given document. As depicted in FIG. 5, a Document 500 comprises multiple Pages 510. Each Page 510 comprises multiple Tokens 512, where each Token 512 is built using one or more Characters 508. Further, the Page 510 also provides Font 514 information for its constituent Tokens 512 and/or Characters 508, along with the reference coordinate system used for positioning text within the page. Each Font 514 may also include one or more FontMetrics 516.

The Text 518 and Entity 520 classes provide definitions for aggregated text. The Text 518 class defines contiguous portions of text (e.g., tokens horizontally adjacent, and possibly wrapped across multiple lines). A find( ) method in the Page 510 class provides a way to locate any text within the page. The find( ) method uses the notion of horizontal and vertical adjacency to ensure that the tokens that make up the text conform to the underlying language positioning rules on the page. The Entity 520 class may refer to a geometric configuration of multiple text fragments that conform to some specifications in terms of both textual and spatial content. The Entity 520 class is the building block for the subsequent higher-level abstraction of entity models in the disclosed framework, as shown in FIG. 4.

One embodiment provides the ability to quickly search and locate text fragments within a document/page. One example implementation utilizes a specialized data structure to achieve this at scale. In one implementations, all entities on a page are grouped by content using a hash map, which enables the system to search for all instances of a particular entity as a constant time O(1) operation. In one embodiment, a hash function is performed on each entity present in the input document to generate hashed entity values. In some embodiments, one or more entities may be grouped into a composite entity. In various embodiments, the entity types of the entities in the composite entity may be the same or different. In one implementation, a row in a table may be a composite entity, where the row is comprised of data elements having a common entity type. For example, the row may be a composite entity formed of entities having the entity type "address," which has a particular entity definition, e.g., a name, followed by a number and street, followed by city, state, and zip code. In some embodiments, a hash function may be performed on each composite entity present in the input document to generate hashed entity values for the composite entities. Next, all the entity rectangles (i.e., bounding boxes) are indexed using a 2-dimensional kd-tree (or r-tree) for efficient search, using the top-right coordinate of the rectangle, for example. Searches may be performed using the top-left coordinate of the query rectangle. Another 4-dimensional kd-tree, built using the top, bottom, left, and right coordinates, may be employed for efficient search of overlapping rectangles with a given query rectangle. In one embodiment, the construction performance for the 2-dimensional and 4-dimensional trees is $O(n \cdot \log(n))$, and the search performance for the 2-dimensional and 4-dimensional trees is $O(\log(n))$, where n is the number of rectangles (entities in this case). These data structures form the foundation for searches, including horizontal and/or vertical adjacency testing, as described below. As such, in some embodiments, there are two parts to locating any entity (which in one form is a string), including (1) searching by content or type, and (2) searching by position. A hash lookup provides a solution to searching by content or type. The kd-trees using bounding boxes provides a solution to searching by position. Splitting the search into two parts as disclosed herein allows the search function to scale when there are many entities in a document, which would otherwise make a brute-force exhaustive linear scan time-prohibitive.

Adjacency between two tokens or entities implies that there is no non-trivial content between them (in the direction of adjacency). It may be further refined as strict adjacency or loose adjacency. Strict adjacency puts a constraint on the length of the gap between the two tokens or entities computed as a statistic reflecting a multiplicative factor of the average width of a space (for horizontal adjacency), or that of the line spacing (for vertical adjacency). Loose adjacency does not impose any restriction. The FontMetrics 516 class houses various font statistics that facilitate such calculations. For example, the font-based distance calculations are applied in the case of tokens to form single-line or multi-line text.

Relative Spatial Positioning Model 404

The relative spatial positioning model 404 enables the disclosed system and method to define textual and spatial constraints on the document content, which is invariant of the underlying rigid coordinates systems as defined by each page of the document (i.e., scale-free relative positioning of content). The spatial information for a character, as defined in FIG. 5, is given by its rectangular bounding box. This spatial characterization using the smallest rectangular bounding box can be extended to words/tokens, phrases, sentences, tables, etc. Ignoring edge cases, the rectangular bounds for any two given characters on a page may be assumed to be non-overlapping. In various embodiments, the relative spatial positioning model 404 includes one or more spatial restrictions, such as a vertical distance restriction (i.e., absolute distance), a horizontal distance restriction (i.e., absolute distance), a relative vertical relationship restriction, or a relative horizontal relationship restriction.

Figure 6:
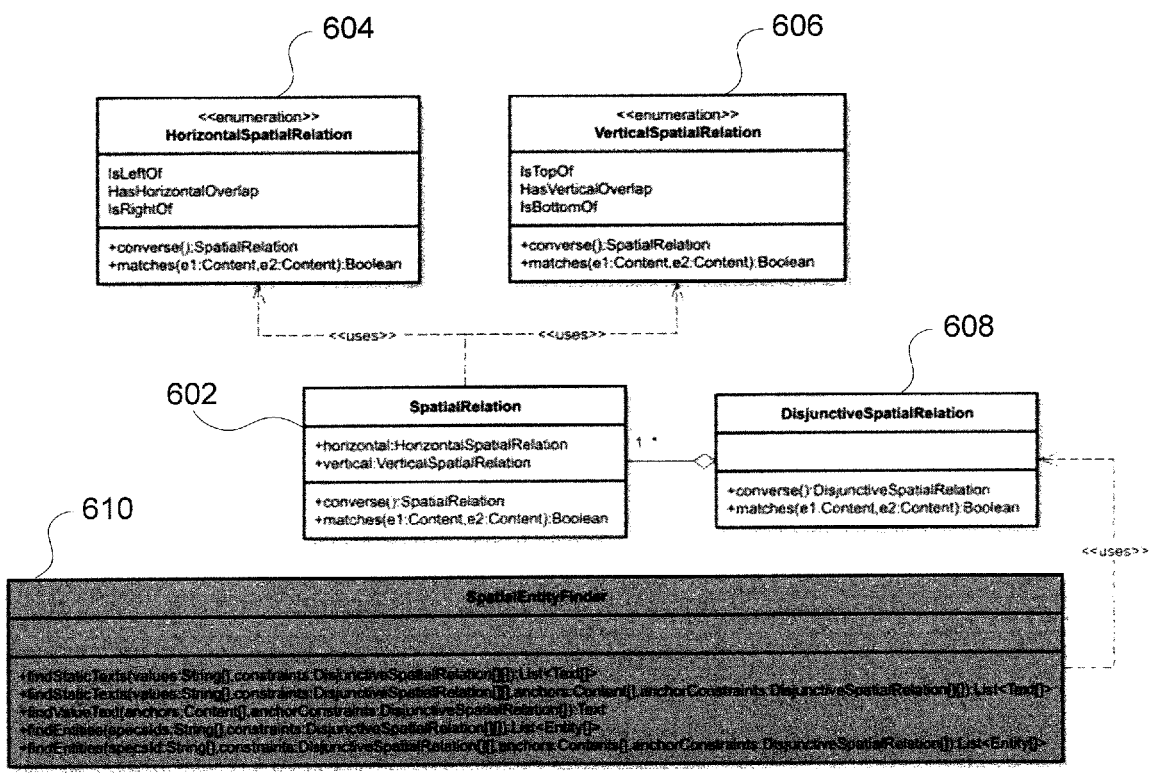
FIG. 6 is an example of a representation of a relative spatial positioning model, according to one embodiment.

FIG. 6 is an example of a UML (Unified Modeling Language) representation of a relative spatial positioning model, according to one embodiment. FIG. 6 defines the common relative spatial positioning rules in the horizontal and vertical directions.

Given any two rectangle bounding boxes, the SpatialRelation 602 class may be used to specify the spatial relation between the two. The SpatialRelation 602 class tests for HorizontalSpatialRelation 604 and VerticalSpatialRelation 606. HorizontalSpatialRelation 604 tests for IsLeftOf, IsRightOf, and HasHorizontalOverlap relations. VerticalSpatialRelation 606 tests for IsTopOf, IsBottomOf, and HasVerticalOverlap relations. As mathematical relations, the relations IsLeftOf, IsRightOf, IsTopOf, and IsBottomOf are all asymmetric relations where the pair captures the converse relation. On the other hand, the relations HasHorizontalOverlap and HasVerticalOverlap are symmetric and reflexive.

While SpatialRelation 602 is perfectly adequate when dealing with any two tokens, it may not be the case when one considers texts, where a text involves multiple tokens. Take the example of the two texts T1="Header" and T2="below is some value"

which are vertically adjacent. The following relations are satisfied:

IsTopOf(T1,T2)

IsBottomOf(T2, T1) [this is implied by the asymmetric relation above]

HasHorizontalOverlap(T1, T2)

HasHorizontalOverlap(T2, T1) [this is implied by the symmetric relation above]

However, if we view T2 as four tokens, say T2=(t1,t2,t3, t4), and assume that both texts T1 and T2 are left justified, we arrive at a new set of relations (not listing the implied relations):

IsTopOf(T1,t1), IsTopOf(T1,t2), IsTopOf(T1,t3), IsTopOf(T1,t4)

HasHorizontalOverlap(T1,t1), HasHorizontalOverlap (T1,t2)

IsLeftOf(T1,t3), IsLeftOf(T1,t4)

Because the bigger rectangle T2 is broken into smaller rectangles, different horizontal relations are satisfied depending on the relative position of the underlying tokens.

To address this, some implementations define the DisjunctiveSpatialRelation 608 as an OR operation over a collection of relations.

A specified spatial constraint defined by DisjunctiveSpatialRelation 608 covers the following cases:

Find all instances of any two texts that satisfy the spatial constraint

Given a fixed text and the spatial constraint, find the text from a set of tokens that satisfies the spatial constraint Extending the second case listed above to a set of fixed texts (instead of a single fixed text), some implementations have a set of DisjunctiveSpatialRelations 608 that need to be all satisfied for each viable token. This spatial constraint may be effectively stated in the Conjunctive Normal Form (CNF) as an AND over a set of ORs. Note that this also applies to the first case where each fixed text within a set of fixed texts is considered separately.

The SpatialEntityFinder 610 class provides convenient utility functions to discover information that are subject to specified spatial constraints, for example, as low-level texts comprised of tokens, or as entities potentially comprised of other entities. A fundamental issue related to such search functionality is the problem of handling multiple feasible solutions. Let us revisit the previous example of T1="Header" and T2="below is some value". However, we now add copies of T1 (i.e., T3) and T2 (i.e., T4), placing T4 below T3, which is below T2, which is below T1. Applying the constraints:

IsTopOf("Header","below is some value")

HasHorizontalOverlap("Header","below is some value")

to all the texts, we have the following feasible solutions:

Solution-1: (T1,T2) and (T3,T4)

Solution-2: (T1,T4)

Note that reuse across instances is not permitted, which voids the solution (T1,T2), (T1,T4), and (T3,T4).

One example implementation enforces the localization principle to select a final candidate from a set of feasible solutions. Effectively, it performs optimization (i.e., minimization) using a cost function that captures the spatial extent of each feasible configuration for any given solution. Based on this, Solution-1 is selected as it is more localized than Solution-2.

While the relative spatial algebra model works well for locating text in spatial context of other texts, it may not provide the necessary precision if we want to locate a particular rectangular area (e.g., a checkmark box) instead of floating text. Using the global page frame coordinates is not viable, as it is neither translation-invariant or scale-invariant.

Figure 7:
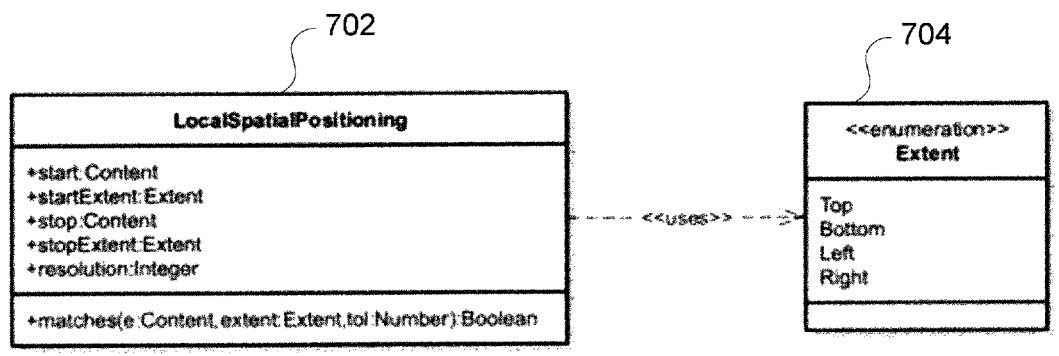
FIG. 7 is an example of a representation of local positioning, according to one embodiment.

Instead, one implementation may use local positioning. FIG. 7 is an example of a UML (Unified Modeling Language) representation of local positioning, according to one embodiment. Local positioning provides that some text is in a fixed position relative to the other relevant content on the page (e.g., column headers for a table). The bounds of such text may be then used as anchors to define a coordinate system, which provides positioning within the local context. Note that one implementation may use more than one local positioning coordinate systems within a page (e.g., different coordinates for positioning values in two different tables on a page).

The LocalSpatialPositioning 702 class uses two reference points x and y using the specified extents 704 of the given two entities to establish a coordinate system. For a query point q, we compute the local position as follows:

$$\text{position}(q) = \frac{q - \min(x, y)}{\max(x, y) - \min(x, y)}$$

The computed position value is a real number. The matches( ) method allows for the specified amount of tolerance (i.e., the tol method parameter) when performing a match. Suitable tolerance values may be computed as a scalar multiple of the average character width/height for the current text font. In one embodiment, the local positioning system is used for special cases, which include determination of text alignment and locating checkboxes.

Spatial Text Content Entity Models 406

Figure 8:
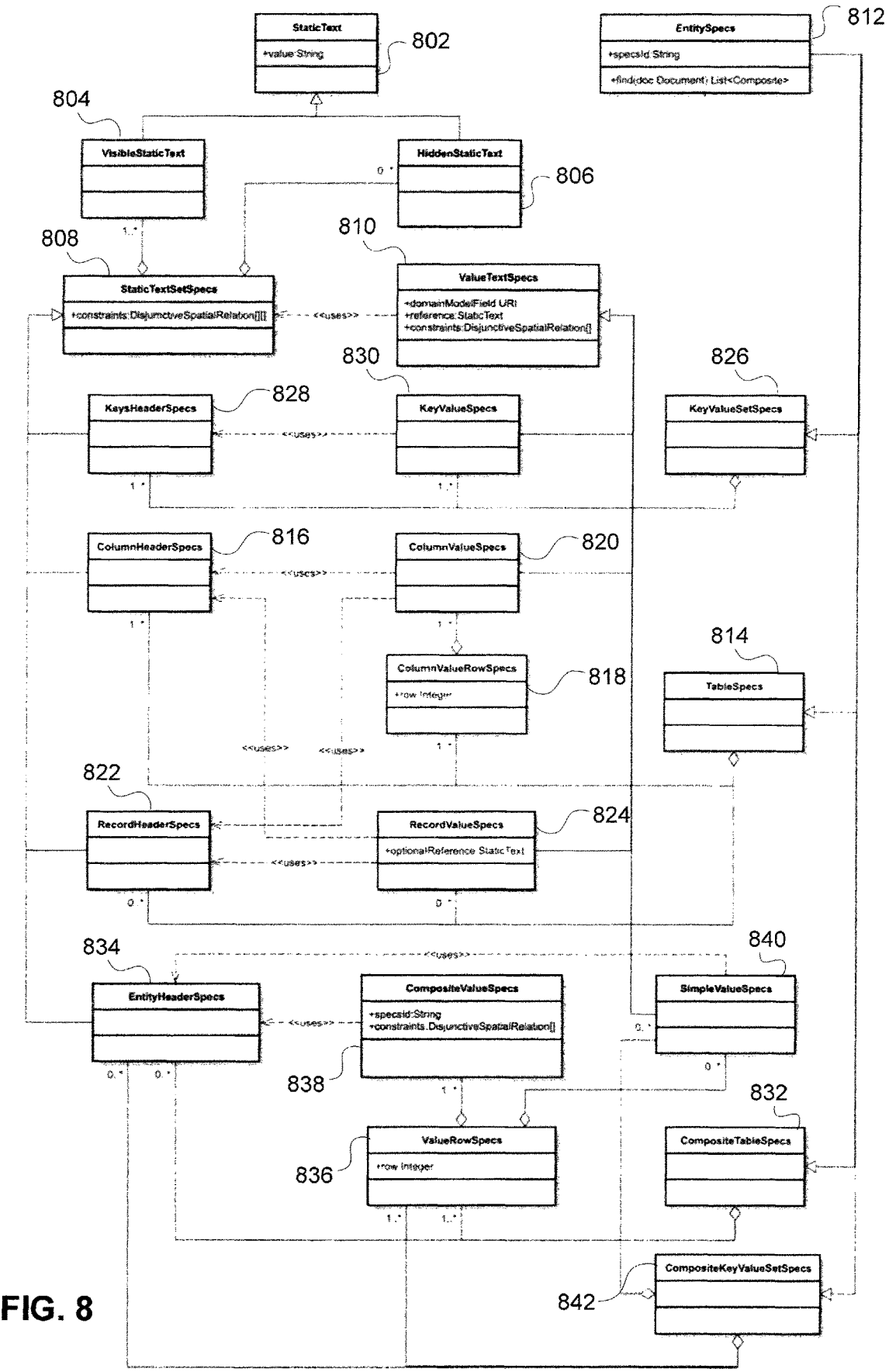
FIG. 8 is an example of a representation of spatial text content entity models, according to one embodiment.

FIG. 8 is an example of a UML (Unified Modeling Language) representation of spatial text content entity models 406, according to one embodiment. The UML representation in FIG. 8 depicts an extensible system and method for defining custom entities, including definitions of tables and key-value set specifications.

The disclosed relative positioning system and method establishes anchors (or static text 802) before applying spatial constraints to discover more information. Such static text often also functions as labels for other information within the document (i.e., visible static text 804). Alternatively, a document may contain information that may not have associated static text or labels shown on the page. This is the function of the HiddenStaticText 806 class that allows specifying a meaningful label to the information, even if such a label is not available on the page.

Given the notion of static text (defined by the StaticText 802 class and its sub-classes), the StaticTextSetSpecs 808 class permits constraints to specified on the VisibleStaticTexts 804 enabling discovery of such instances within any given document. The ValueTextSpecs 810 class provides the counterpart for discovering values associated with these static texts within the document. For each value, the ValueTextSpecs 810 class provides associated constraints with respect to all the visible static text. The EntitySpecs 812 class provides the base definition for all entity types. The EntitySpecs 812 class provides an identifier for each type of entity defined.

FIG. 8 also shows some examples of entities using the above-discussed system and method, as described below.

Tables (Class TableSpecs 814)

Table structures form the basis for many contents of semi-structured documents, such as loss run documents. To cater to complex table layouts, one embodiment views a table as containing zero or more records, as opposed to rows. A single table record may contain multiple different rows of information in some implementations. A simple table would only have a single row of values for each record. A table specification, defined by TableSpecs 814 class in FIG. 8 comprises of:

Column headers (ColumnHeaderSpecs 816)—Represents a set of static texts that appear once for each table instance. These provide labels for column values that appear in the table records. The class ColumnHeaderSpecs 816 is a sub-class of StaticTextSetSpecs 808.

Column value rows (ColumnValueRowSpecs 818)— Each row is a set of column value specifications.

Simple tables would define a single row of values. A table record would contain at least one instance of each row.

Column values (ColumnValueSpecs 820)—A set of value specifications that are spatially constrained using the column headers and the record headers (if specified). The class ColumnValueSpecs 820 is a sub-class of ValueTextSpecs 810. Each value references a column header.

Record headers (RecordHeaderSpecs 822)—An optional set of static texts that appear once for each table record. These provide labels for record values that appear in the table records. The class RecordHeaderSpecs 822 is a sub-class of StaticTextSetSpecs 808.

Record values (RecordValueSpecs 824)—An optional set of value specifications that are spatially constrained using the column headers, and the record headers. The class RecordValueSpecs 824 is a sub-class of ValueTextSpecs 810. Each value references a record header, and may optionally reference a column header.

Key-Value Sets (Class KeyValueSetSpecs 826)

Another common structure found in semi-structured documents is a key-value set. In its simplest form, a key-value set is a collection of (label, value) content pairs. Complex cases include the scenario where the label may not be displayed (i.e., hidden). A key-value set specification, defined by KeyValueSetSpecs 826 in FIG. 8 comprises:

Key headers (KeyHeaderSpecs 828)—A set of static texts that appear once for each instance. These provide labels for key values. The class KeyHeaderSpecs 828 is a sub-class of StaticTextSetSpecs 808.

Key values (KeyValueSpecs 830)—A set of value specifications that are spatially constrained using the key headers. The class KeyValueSpecs 830 is a sub-class of ValueTextSpecs 810. Each value references a key header.

Composite Table Sets (Class CompositeTableSpecs 832)

This entity is an extension of the basic table specification defined earlier, in the sense that the values of this table reference other entity specifications. For example, an address label sheet may have multiple addresses arranged in a grid (e.g., three (3) addresses on each row). Each address entry could be a key-value set with a name and a mailing address. The composite table would define a single row with three values, where each value has the address key-value set specification. A composite table specification, defined by CompositeTableSpecs 832 in FIG. 8 comprises:

Table headers (class EntityHeaderSpecs 834)—An optional set of static texts that appear once for each table instance. The class EntityHeaderSpecs 834 is a sub-class of StaticTextSetSpecs 808.

Table value rows (ValueRow Specs 836)—Each row is a set of value specifications. Simple tables would define a single row of values. A table record would contain at least one instance of each row.

Table values (CompositeValueSpecs 838, SimpleValueSpecs 840)—A set of value specifications that are spatially constrained using the entities within a record, and optionally the table headers. Each composite value references a CompositeSpecs:specsId identifier. The class SimpleValueSpecs 840 is a sub-class of ValueTextSpecs 810.

Composite Key-Value Sets (Class CompositeKeyValueSetSpecs 842)

This entity is an extension of the basic key-value set specification defined earlier, in the sense that the values reference other entity specifications. For example, consider a document where the address key-value set (as defined in the section above) appears at the top of each page. However, the address key-value set is combined with one of two other (label, value) content patterns, each of which is also modeled as a key-value set. One implementation can define two composite key-value sets by reusing the address key-value set in both to capture the two types of page headers. A composite key-value set specification, defined by CompositeKeyValueSetSpecs 842 in FIG. 8 comprises:

Key headers (EntityHeaderSpecs 834)—An optional set of static texts that appear once for each instance. The class EntityHeaderSpecs 834 is a sub-class of StaticTextSetSpecs 808.

Key values (CompositeValueSpecs 838, SimpleValueSpecs 840)—A set of value specifications that are spatially self-constrained, and may optionally also be constrained using the key headers. The class CompositeValueSpecs 838 is a sub-class of ValueTextSpecs 810. Each composite value references a CompositeSpecs:specsId identifier. The class SimpleValueSpecs 840 is a sub-class of ValueTextSpecs 810.

Note that the optimization technique using localization for the selection of a solution from a set of feasible solutions, as described above, may be applied to any entity. For example, Composite entities that are effectively the instances of CompositeTableSpecs 832 and/or CompositeKeyValueSetSpecs 842 when applied to any given document.

Content Metadata

While the disclosed relative positioning system and method provides a robust spatial information extraction technique (as opposed to brittle exact reference frame coordinates), it also reduces precision in the sense that tokens in the "middle" regions between two competing set of spatial constraints may have ambiguous membership. To address this, the disclosed system and method employ additional tools to ensure that the extracted content conforms with expectations for the content and gets processed as the correct type of content. The following describes two specific methods that employ content metadata for accurate information extraction: (1) Regular Expressions, and (2) Alignment Statistics.

Regular Expressions (for Known Textual Content Types)

Based on domain knowledge, certain expectations should be met for the formats and patterns of extracted content. Some embodiments can enforce these expectations and flag or correct discrepancies as part of the disclosed information extraction system and method by utilizing regular expressions that are common to the specific domain. For example, for the loss run document 300 in FIG. 3 related to the insurance industry domain, the disclosed system and method may understand that content associated with the "Date of Loss" column header should be a date and should appear in a format having a month, day, and year.

Alignment Statistics

Some disclosed embodiments exploit text alignments to correctly associate the extracted content. In one implementation, column and record values in a table get assigned to their corresponding column and record headers by utilizing alignment of content across different table records. For example, some implementations may recognize that all the values in the "Paid" column (i.e., 5,450; 10,000; 5,000; 0) in FIG. 3 are right-aligned and conceptually belong together. Similarly, some implementations may detect that the values 1,000; 0; 0; 0 underneath the "Reserve" column header are all left-aligned and again should belong together conceptually. Some embodiments may targets the justification problem (i.e., left justified, right justified, center) with text in both directions. Some embodiments compute statistics for both vertical and horizontal alignment based on training samples. Specifically, horizontal alignment pertains to left, right, or center alignment modes; whereas, vertical alignment pertains to top, bottom, or center alignment modes. The computed statistics are based on the local positioning scheme described earlier. In some implementations, sample statistics for all modes are computed based on the training sample. Then a hypothesis test may be performed to determine which modes should be eliminated from the feasibility set. The model retains the feasible modes as determined by the training data samples. This is applied to unknown data at runtime for conflict resolution and disambiguation.

Spatial Entity Relationship Models 408

Figure 9:
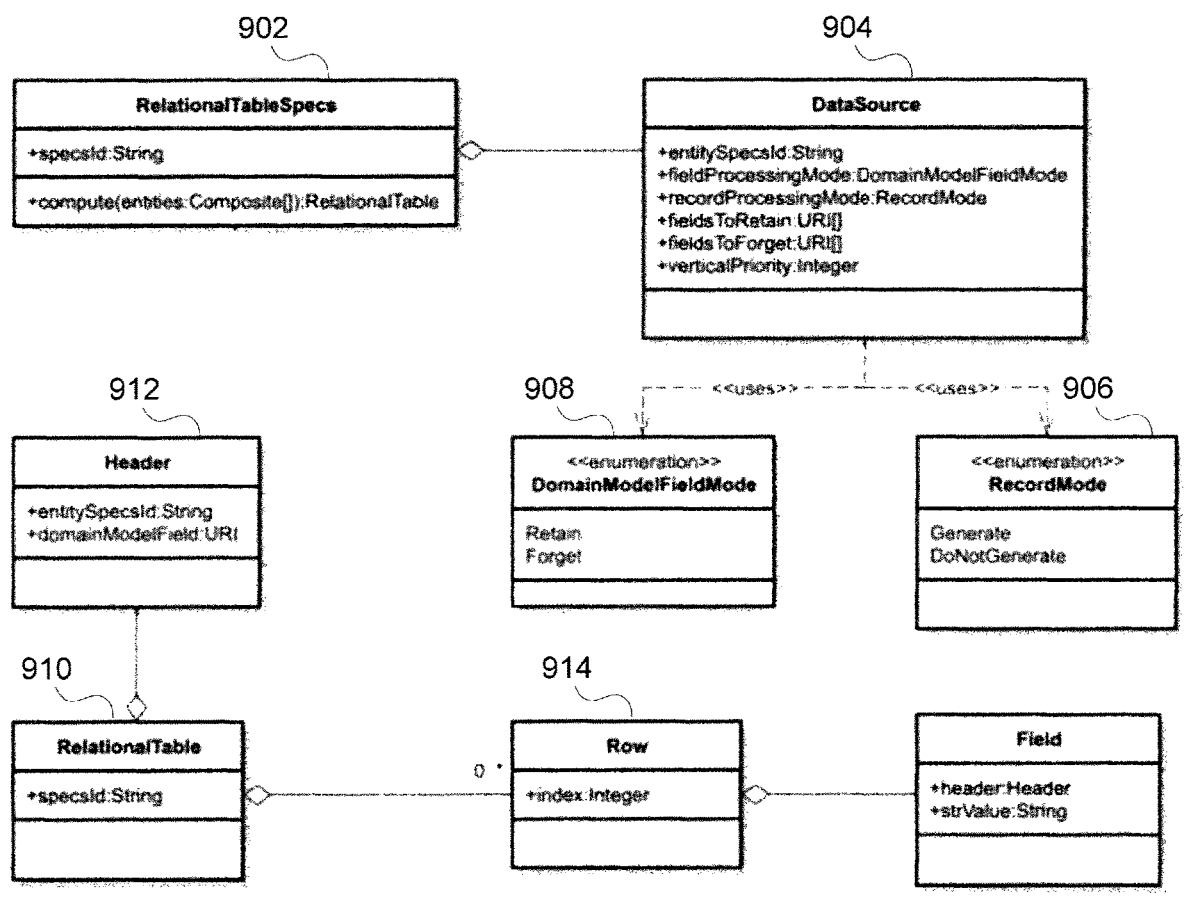
FIG. 9 is an example of a representation of spatial entity relationship models, according to one embodiment.

FIGS. 5-8 show one implementation for how to extract information that is both spatial and textual in nature, where the spatial configuration of such information is localized. FIG. 9 is an example of a UML (Unified Modeling Language) representation of spatial entity relationship models 408, according to one embodiment. Spatial entity relationship models 408 enable construction of relationships across multiple pages of a document; for example, linking an entity that only appears on the first (or last) page to other entities that occur multiple times within the document. This functionality is captured by the spatial entity relationship models 408 as depicted in FIG. 9.

Information Scopes

As described above, different pieces of content within a document can have different "scopes" of validity. As shown in FIG. 3, some content may apply globally to all other content, whereas other content may only apply locally to a limited set of other pieces of content. FIG. 3 provides examples of different information scopes. For example, the content "VALUATION DATE: 3/21/2018" would apply globally to all other content (i.e., scope 310)—every other piece of information in this loss run corresponds to the same valuation date of 3/21/2018. On the other hand, the content "Policy Number: X12-ABC5559999" would only apply to the records in the table underneath that particular policy number, not to all table records in the document (i.e., the next table in this example would be associated with the content "Policy Number: P43-ABC 5559999"). The disclosed system and method can differentiate between different scopes of applicability for different pieces of content, as described below.

Tabular Representation

Some embodiments provide functionality to define specifications for relationship extraction. One implementations can choose the use of relational tables as the method of storage, instead of an information graph. Once the scope of individual pieces of content is known, embodiments of the disclosure can combine individual pieces of content into logically connected bundles of content. For example, in FIG. 3, the section following a "Policy Number" could form such a bundle of content. The disclosed system and method allow for flexible definition of which pieces of content to bundle together, and stores the bundled content in tabular format for further processing, regardless of whether the content occurred as part of a table, or a key-value set, and regardless of the scope of applicability discussed above. For example, one implementation would bundle together content from the table underneath "Policy Number" with the content extracted for "VALUATION DATE:" even though the scopes of the corresponding content are different.

FIG. 9 shows the UML representation of a relational table. Multiple relational tables may be extracted for any given document. The class RelationalTableSpecs 902 defines a relation between entities, in this case a relational table. The relational table comprises one of more DataSources 904. The input for a given DataSource 904 is all the extracted instances corresponding to some defined entity (e.g., entitySpecsId). All the textual extracted values, as part of entity extraction, are mapped to a domain model field URI as defined in ValueTextSpecs:domainModelField. In some implementations, a relation extraction engine inspects the relational table specifications, and initializes a table where the table columns are the union of all domain model fields that are linked to the associated data sources. Note that the same field URI may appear multiple times across different extracted entities, or even within the same entity. Unique references may be guaranteed by prefixing the source specs identifiers to the field URI.

In one implementation, first all the extracted information on the page is ordered. The default is using the vertical order of appearance, which may be overridden using DataSource: VerticalPriority. Using non-default priorities, the specification may take a key-value set on the last page of a document and apply that first before processing other entities within the document. Once the order is established, two basic steps must be performed repeatedly:

1. Starting at the top (based on priority), select the next extracted entity that should be processed. Exit the procedure if there is no more information to process.
2. Generate a new record or update an existing record based on the RecordMode 906 for the current data source entity. By default, each record of a table will generate a new record in the relational table, whereas a key-value set will only update the current record in the relational table.

There is no ambiguity if we have a new value for a specific field column in the relational table. For an update operation, the old value is replaced with the new value. For a create operation, some embodiments simply use the new value.

In some cases, there is no value available for the field in question. This is where the DomainModelFieldMode 908 value is useful. DomainModelFieldMode 908 defines the behavior when a new value for a field is not available from the current data source. The DataSource 904 class permits a global setting via the fieldProcessingMode attribute, and finer control using the fieldsToRetain and fieldsToForget attributes. By default, tables use the Forget mode, where a new record forgets all prior values in the previous record, and key-values sets use the Retain mode, where information is retained across instances, and only incrementally added/updated.

The output of applying a RelationalTableSpecs 902 instance is given by Relational Table 910. Relational Table 910 provides header information 912 for all the columns, and each Row 914 is effectively a joint record across all the associated extracted entities.

As such, the disclosed information extraction system and method starts with an input document, applies entity and relational table specifications to the input document, and obtains a set of relational tables as output. Note that the output may use domain-specific field names. One example implementation of the disclosed system and method performs these operations as a collection of Java libraries, also exposed via a RESTful service, which allows for integration with other applications.

Model Creation and Updating

Figure 10:
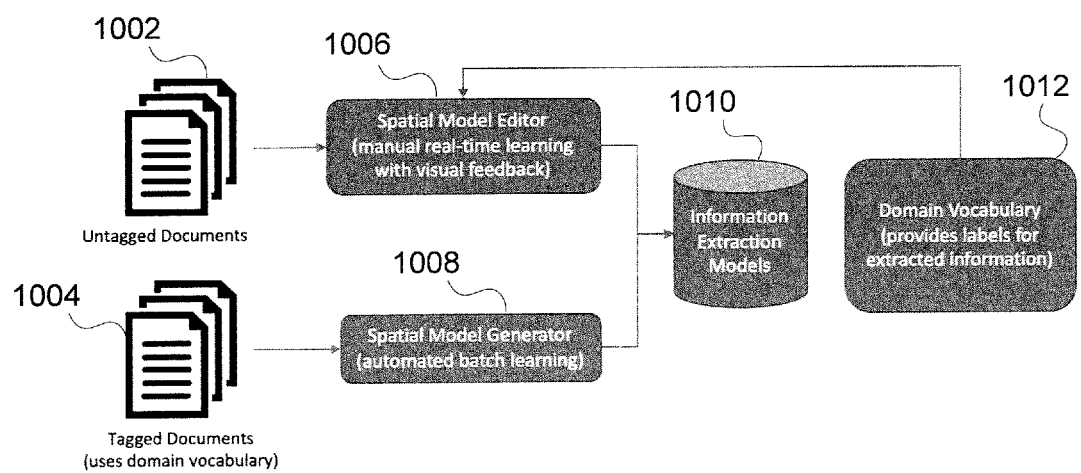
FIG. 10 is a block diagram illustrating model creation and updating, according to one embodiment.

FIG. 10 is a block diagram illustrating model creation and updating, according to one embodiment. In order to automatically perform processing on input documents, an information extraction model 1010, as described herein, is trained using training samples. The model comprises one or more entity specifications and associated relational table specifications. Entity specifications (e.g., tables and key-value sets) are fitted using training samples. Mapping metadata for the extracted content to the domain model is provided as part of the training samples.

The information extraction model 1010 can be created and/or updated using a spatial model editor 1006 and/or using a spatial model generator 1008.

In one embodiment, in order to define the model for any given document along the dimensions outlined above, a spatial model editor 1006 is provided. The spatial model editor 1006 allows a user to define and/or update the information extraction model 1010 directly through interacting with a visual representation of an input document 1002 (i.e., untagged input document) in a GUI (graphical user interface).

An input document 1002 is provided to the spatial model editor 1006, which is a software application comprised of instructions executed by a processor. If a current version of the information extraction model 1010 exists, the information extraction model 1010 is applied to the input document 1002 and a visual representation of the extracted information is displayed in a GUI. If no current model exists for this type of input document 1002, then an untagged representation of the input document 1002 may be displayed in the GUI.

In operation, the spatial model editor 1006 applies a current version of the information extraction model 1010 (and corresponding domain vocabulary 1012) to the input document 1002 in real-time. The results may be displayed as a visual representation, where domain variables are highlighted on the document in a first color, and corresponding domain values (extracted from the input document 1002) are highlighted in a second color.

The user can view the results and make changes or additions to the extracted information. For example, the user may select a token (e.g., word, table entry, etc.). In some embodiments, the selection may be of one or more tokens. A dialog may be presented in the GUI, where the user may select a domain variable to which the selected one or more tokens should be assigned, thereby providing a new piece of tagged training data. In one embodiment, a single token is selected and assigned to a single domain variable. In another embodiment, two or more tokens are selected and assigned to a single domain variable. In yet another embodiment, two or more tokens are selected and assigned to two or more domain variables. The tagged training data is implicitly created as a result of the user interacting with the spatial model editor 1006. The tagged training data is then used to update the current version of the information extraction model 1010 to an updated version. The updated version of information extraction model 1010 is then re-applied to the input document 1002. This enables incremental learning in real-time, where other tokens in the document that were previously untagged may now become associated with certain domain variables based on the user-defined tagging.

As such, the user can enter information through the spatial model editor 1006 related to relative spatial positioning information, spatial text content entity models, content metadata, and content labels. In some cases, using a spatial model editor 1006 provides efficiency, since the spatial model editor 1006 can automatically calculate relative spatial constraints much more quickly than a user would be able to manually enter as training data, especially for a large number of static texts and values for entities relative to which spatial positioning needs to be defined. In some cases, using a spatial model editor 1006 provides enhanced consistency, since the spatial model editor 1006 applies the same logic consistently across a large number of pieces of individual content and static texts.

The spatial model editor 1006 can apply the aforementioned methodologies in real-time when processing an input document 1002, visualize the output that would be extracted, and thereby allow the user to make modifications to relative spatial positioning information, spatial text content entity models, content metadata, and content labels.

The spatial model editor 1006 enables the user to train the model in real-time, and can see the results of the training in real-time. The training therefore happens instantaneously on the basis of as few as one input document, rather than requiring multiple (possible hundreds or thousands) of documents, such as in conventional machine learning approaches. For example, if the spatial constraints for a table are slightly different in a given document relative to the spatial model already entered for this type of document, the user can enter a modification through the GUI of the spatial model editor 1006, and the model immediately incorporates this additional information for this type of document. The outcome of the incorporated changes is immediately visible in the spatial model editor 1006, and can be further adjusted and/or reversed as needed.

In some implementations, a spatial model generator 1008 can also be used as part of a real-time incremental learning feature. The spatial model generator 1008 takes as input training samples 1004 (i.e., tagged documents), which may be implicitly created by the spatial model editor 1006, and creates or updates an information extraction model 1010. Model fitting is performed by computing the most restrictive spatial constraints and related statistics (e.g., alignment metadata) for a given set of training samples. An existing information extraction model 1010 is updated by relaxing restrictions, if necessary, to fit additional training samples.

The information extraction models 1010 are stored in an information extraction model repository. The disclosed system and method provide management functionality for the repository. The repository 1010 may be a database or a storage in a computing device that processes the input documents. The repository 1010 may also be connected over a network.

As described, the disclosed system and method allows the user to train the extraction mechanism on identifying and extracting "building blocks" of information. For example, one table could form such a building block of information, or one specific instance of a key-value set. In some implementations, the system and method allow for re-using such building blocks that have been defined previously (even for another type of document altogether), and use them as a new unit on top of which other structures can be built. For example, one implementation would allow the user to define a key-value set (or take a previously defined key-value set) and use that structure as the building blocks for defining rows in a table or elements of a key-value set. Spatial constraints are then defined between the building blocks as a whole, rather than between the individual elements that make up the building blocks.

In various embodiments, the platform provides automated model compatibility checking by verifying that:
- the set of domain model fields specified within an entity model is present in the associated domain model; and/or
- the set of referenced entity specification identifiers in a relational table model is defined in the associated entity model; and/or the set of referenced domain model fields for each entity model within a relational table model is present in the definition of the associated entity model.

Figures 11A, 11B:
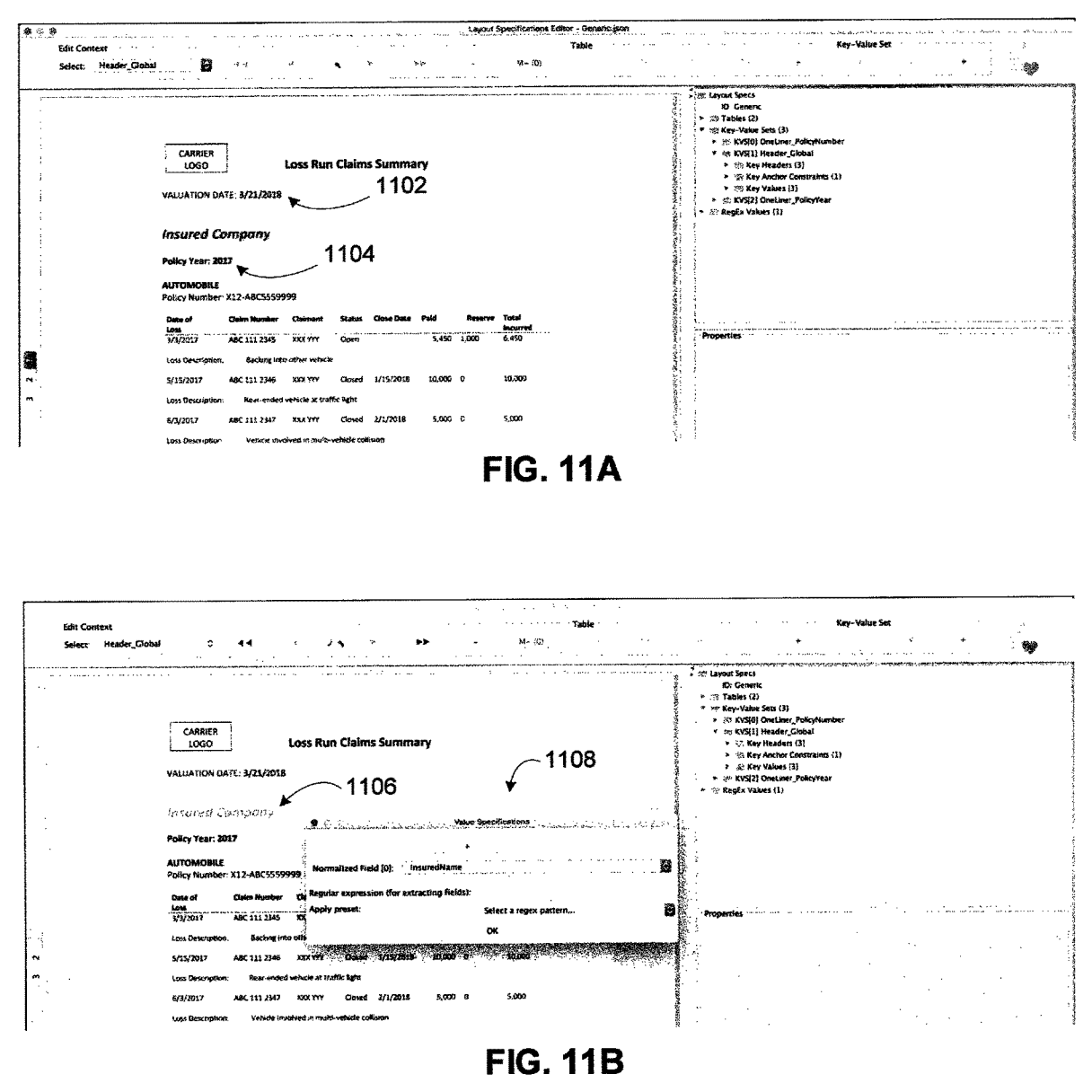

FIG. 11A is a screenshot of a spatial model editor, according to one embodiment. As shown, various pieces of information identifies as key-value pairs are highlighted in a document after applying an existing model to the document. For example, key-value pair 1102 is identified as a "Valuation Date" having a value of "3/21/2018," and key-value pair 1104 is identified as a "Policy Year" having a value of "2017."

FIG. 11B is a screenshot of a dialog for mapping extracted content using a spatial model editor, according to one embodiment. As shown in the example in FIG. 11B, information 1106 is extracted, namely the text "Insured Company." The model may not be able to automatically identify what field this entity belongs to. A dialog 1108 is displayed in the GUI of the spatial model editor that allows a user to specify, for example by selecting from a drop-down list, the domain variable that this entity belongs to. In this example, the text "Insured Company" is labelled as corresponding to the domain variable InsuredName.

Information Extraction Engine for Applying a Model to a Document (Execution)

Figure 12:
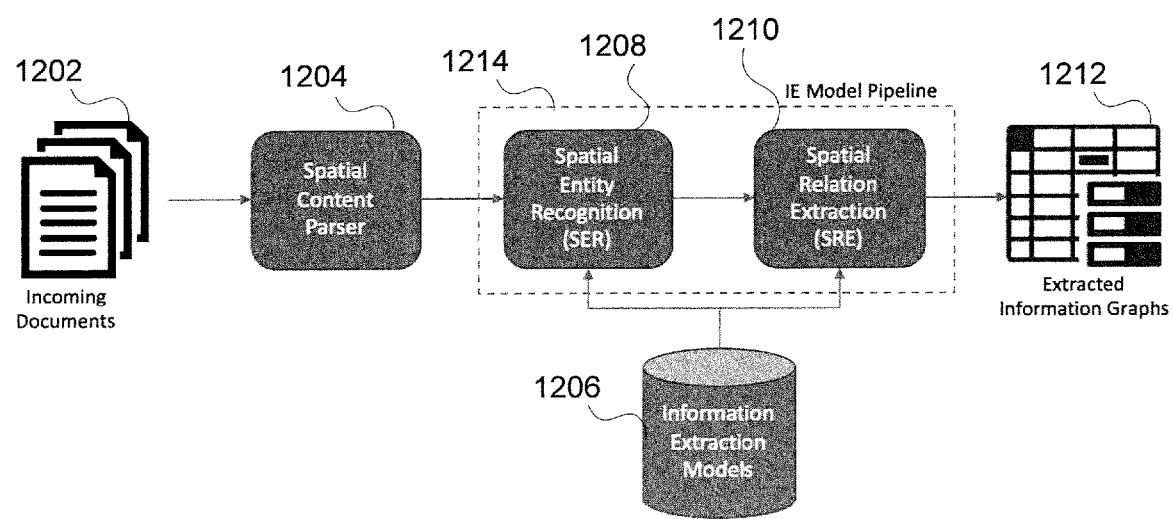
FIG. 12 is a block diagram that illustrates information extraction from a semi-structured document, according to one embodiment.

FIG. 12 is a block diagram that illustrates information extraction from a semi-structured document, according to one embodiment. In various embodiments, the system and method can provide simultaneous processing of multiple documents. In various embodiments, the system and method can provide simultaneous application of multiple models to a single document. In various embodiments, the system and method can provide real-time document processing status.

In some embodiments, a given input document 1202 can be processed through different model pipelines simultaneously. Each model pipeline 1214 includes a spatial entity recognition module (SER) 1208 and a spatial relation extraction module (SRE) 1210. Both modules 1208, 1210 may be implemented as software modules comprising instructions executed by a processor.

The spatial entity recognition module (SER) 1208 receives an entity specification file that includes a model identifier and one or more entity model specifications from a model repository 1206. The spatial relation extraction module (SRE) 1210 receives a relation specification file that includes a matching model identifier and one or more relation table model specifications.

As shown, an input document 1202 is provided to a spatial content parser 1204. If the document cannot be parsed, the document is marked as such, and no further processing is performed. The spatial content parser 1204 is responsible for converting any document to an instance of the Document class as defined in FIG. 5. One example implementation defines a compatible JSON format, along with multiple parsers that provide a conformant JSON document as output.

Each available model pipeline 1214 is applied to the parsed document independently (for example, parallelized in one implementation). The input document 1202 is tagged with the model identifier for each model pipeline, along with a status value (i.e., one for each model pipeline) initialized to "processing." If the processing of any model pipeline fails to complete, the associated status value is set to "failed" and no further processing is performed for that pipeline.

If a model pipeline process completes successfully, there can either be no output or some non-trivial output. If there is no output (i.e., no content was found matching any of the entity or relation extraction specifications), the associated status value is set to "done—no match." Note, that the output may be non-empty if an empty table is detected, as the presence of the table would be reported. For non-trivial output, the associated status value is set to "done match." The resulting relational tables along with any intermediate outputs are stored, and the relevant document pipeline metadata is updated. The output from each model pipeline 1214 is stored in one or more information graphs 1212, as described herein.

Figure 13:
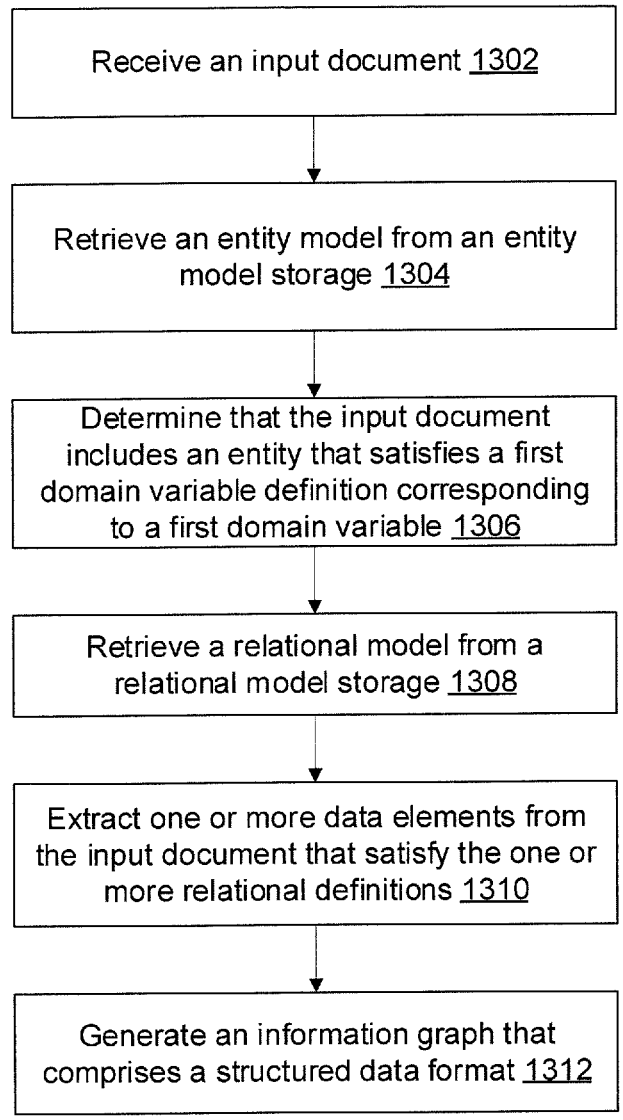
FIG. 13 is a flow diagram of method steps for information extraction from a semi-structured document, according to one embodiment.

FIG. 13 is a flow diagram of method steps for information extraction from a semi-structured document, according to one embodiment. The method beings at step 1302, where a processor (e.g., a processor included in a computing device 102) receives an input document to be processed. As described, the input document may be a semi-structured document. In one implementation, the input document is paginated, e.g., if the input document includes multiple pages. Each page may be pre-processed, for example by performing OCR on each page of the document, if document text is not extractable from the document directly.

At step 1304, the processor retrieves an entity model from an entity model storage. In some embodiments, one or more entity models are retrieved. Each entity model provides one or more domain variable definitions for one or more domain variables, where the entity model and the input document correspond to a common domain. The entity models may be stored in a database/storage or over a network.

At step 1306, the processor determines that the input document includes an entity that satisfies a first domain variable definition corresponding to a first domain variable. In one embodiment, step 1306 comprises sub-steps of: locating anchors and/or entries in the input document (e.g., by looking up the hash values of tokens in the input document), forming entities including deciding between competing options, obtaining candidate values using entity model constraints, and deciding ambiguities using localization, as described herein. In some embodiments, the entity models are iteratively updated based on the results of extracting entities from input document.

At step 1308, the processor retrieves a relational model from a relational model storage. In some embodiments, one or more relational models are retrieved. Each relational model provides, for one or more domain variables, one or more relational definitions for one or more values corresponding to the given domain variable. The relational models may be stored in a database/storage or over a network. In various embodiments, the entity model storage is the same or different than the relational model storage.

At step 1310, the processor extracts one or more data elements from the input document that satisfy the one or more relational definitions. In one embodiment, step 1310 comprises sub-steps of: reordering entities based on page and model entity and/or variable priorities, and merging entity data to generation relational tables, as described herein. As described herein, the one or more data elements that satisfy the one or more relational definitions corresponding to one domain variable may include multiple entities. For example, a table comprising multiple table records may be extracted as the one or more data elements that satisfy the one or more relational definitions (corresponding to a first domain variable).

At step 1312, the processor generates an information graph that comprises a structured data format. In some embodiments, the structured data format may be a table data structure or a data structure formed of nodes connected by edges. In some embodiments, the structured data format may include tables that are linked to one another. For example, the output may be a relational data table with information extracted from the input document in a two-dimensional (or n-dimensional) format.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following embodiments) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for information extraction from an electronic document, the method comprising:
    receiving, by a processor, an input document, wherein the input document is a semi-structured document;
    retrieving, by the processor, an entity model from an entity model storage, wherein the entity model provides one or more domain variable definitions for one or more domain variables, wherein the entity model and the input document correspond to a common domain;
    determining, by the processor, that the input document includes an entity that satisfies a first domain variable definition corresponding to a first domain variable;
    retrieving, by the processor, a relational model from a relational model storage, wherein the relational model provides, for the first domain variable, one or more relational definitions for one or more values corresponding to the first domain variable, wherein the one or more relational definitions for the one or more values corresponding to the first domain variable comprise one or more spatial restrictions constrained by a length of a gap between entities, wherein the one or more spatial restrictions are computed based on an average width of a horizontal space between entities for horizontal adjacency or based on average line spacing for vertical adjacency;
    extracting, by the processor, one or more data elements from the input document that satisfy the one or more relational definitions; and
    generating, by the processor, an information graph having a structured data format, wherein the one or more data elements extracted from the input document correspond to the first domain variable in the structured data format.

2. The method according to claim 1, further comprising:
    analyzing the input document to identify each entity present in the input document; and
    performing a hash function on each entity present in the input document to generate hashed entity values;
    wherein determining that the input document includes the entity that satisfies the first domain variable definition corresponding to the first domain variable comprises performing a hash lookup in the hashed entity values.

3. The method according to claim 1, further comprising:
    identifying one or more entities having a first entity type;
    forming a composite entity comprising the one more entities identified as having the first entity type; and
    performing a hash function on the composite entity to generate a hashed entity value;
    wherein determining that the input document includes the entity that satisfies the first domain variable definition corresponding to the first domain variable comprises performing a hash lookup and locating the hashed entity value corresponding to the composite entity.

4. The method according to claim 1, wherein the one or more spatial restrictions include a vertical distance restriction, a horizontal distance restriction, a relative vertical relationship restriction, or a relative horizontal relationship restriction.

5. The method according to claim 1, further comprising:
    determining absolute spatial positioning information for each entity present in the input document;
    determining a minimum bounding box for each entity present in the input document based on the absolute spatial positioning information; and
    identifying the one or more data elements from the input document that satisfy the one or more relational definitions based on the minimum bounding box for each entity present in the input document.

6. The method according to claim 1, wherein the one or more data elements from the input document that satisfy the one or more relational definitions corresponding to the first domain variable comprise a key-value set or a table of information having multiple rows of table records.

7. The method according to claim 1, wherein the one or more data elements from the input document that satisfy the one or more relational definitions corresponding to the first domain variable span two or more pages of the input document.

8. The method according to claim 1, wherein the common domain comprises an insurance document domain, and the input document comprises a loss run document.

9. The method according to claim 1, wherein the information graph comprises a JSON (JavaScript Object Notation) format.

10. The method according to claim 1, further comprising:
displaying on a display device a visual representation of the input document, wherein the entity that satisfies the first domain variable definition and the one or more data elements that satisfy the one or more relational definitions are emphasized in the visual representation of the input document.

11. The method according to claim 10, further comprising:
displaying in the visual representation of the input document one or more second entities;
receiving a selection in the visual representation of the one or more second entities;
displaying a dialog that provides options for selecting a domain variable in the entity model to associate with the one or more second entities;
receiving a selection from the dialog of a second domain variable; and
associating the one or more second entities with the second domain variable.

12. The method according to claim 11, further comprising:
updating the entity model and the relational model to generate an updated entity model and an updated relational model based on associating the one or more second entities with the second domain variable.

13. The method according to claim 12, further comprising:
applying the updated entity model and the updated relational model to the input document;
extracting one or more third entities from the input document that satisfies a second domain variable definition of the second domain variable in the updated entity model;
extracting one or more third data elements from the input document that satisfies a spatial relational definition in the updated relational model, wherein the spatial relational definition corresponds to the second domain variable; and
displaying on the display device the visual representation of the input document, wherein the one or more third entities and the one or more third data elements are emphasized in the visual representation of the input document.

14. A non-transitory computer-readable storage medium storing instructions that, when executed by a processor, cause a computing device to perform a method for information extraction from an electronic document, by performing the steps of:
receiving an input document, wherein the input document is a semi-structured document;
retrieving an entity model from an entity model storage, wherein the entity model provides one or more domain variable definitions for one or more domain variables, wherein the entity model and the input document correspond to a common domain;
determining that the input document includes an entity that satisfies a first domain variable definition corresponding to a first domain variable;
retrieving a relational model from a relational model storage, wherein the relational model provides, for the first domain variable, one or more relational definitions for one or more values corresponding to the first domain variable, wherein the one or more relational definitions for the one or more values corresponding to the first domain variable comprise one or more spatial restrictions constrained by a length of a gap between entities, wherein the one or more spatial restrictions are computed based on an average width of a horizontal space between entities for horizontal adjacency or based on average line spacing for vertical adjacency;
extracting one or more data elements from the input document that satisfy the one or more relational definitions; and
generating an information graph having a structured data format, wherein the one or more data elements extracted from the input document correspond to the first domain variable in the structured data format.

15. The computer-readable storage medium according to claim 14, further comprising:
analyzing the input document to identify each entity present in the input document; and
performing a hash function on each entity present in the input document to generate hashed entity values;
wherein determining that the input document includes the entity that satisfies the first domain variable definition corresponding to the first domain variable comprises performing a hash lookup in the hashed entity values.

16. The computer-readable storage medium according to claim 14, further comprising:
identifying one or more entities having a first entity type;
forming a composite entity comprising the one more entities identified as having the first entity type; and
performing a hash function on the composite entity to generate a hashed entity value;
wherein determining that the input document includes the entity that satisfies the first domain variable definition corresponding to the first domain variable comprises performing a hash lookup and locating the hashed entity value corresponding to the composite entity.

17. The computer-readable storage medium according to claim 14, wherein the one or more spatial restrictions include a vertical distance restriction, a horizontal distance restriction, a relative vertical relationship restriction, or a relative horizontal relationship restriction.

18. The computer-readable storage medium according to claim 14, further comprising:
determining absolute spatial positioning information for each entity present in the input document;
determining a minimum bounding box for each entity present in the input document based on the absolute spatial positioning information; and
identifying the one or more data elements from the input document that satisfy the one or more relational definitions based on the minimum bounding box for each entity present in the input document.

19. The computer-readable storage medium according to claim 14, wherein the one or more data elements from the input document that satisfy the one or more relational definitions corresponding to the first domain variable comprise a key-value set or a table of information having multiple rows of table records.

20. A computing device, comprising:
a memory storing instructions; and
a processor configured to execute the instructions to cause the computing device to perform information extraction from an electronic document by:
receiving an input document, wherein the input document is a semi-structured document;
retrieving an entity model from an entity model storage, wherein the entity model provides one or more domain variable definitions for one or more domain variables, wherein the entity model and the input document correspond to a common domain;

determining that the input document includes an entity that satisfies a first domain variable definition corresponding to a first domain variable;

retrieving a relational model from a relational model storage, wherein the relational model provides, for the first domain variable, one or more relational definitions for one or more values corresponding to the first domain variable, wherein the one or more relational definitions for the one or more values corresponding to the first domain variable comprise one or more spatial restrictions constrained by a length of a gap between entities, wherein the one or more spatial restrictions are computed based on an average width of a horizontal space between entities for horizontal adjacency or based on average line spacing for vertical adjacency;

extracting one or more data elements from the input document that satisfy the one or more relational definitions; and generating an information graph having a structured data format, wherein the one or more data elements extracted from the input document correspond to the first domain variable in the structured data format.

* * * * *